United States Patent
Eguchi et al.

(10) Patent No.: US 7,525,759 B2
(45) Date of Patent: Apr. 28, 2009

(54) MAGNETIC DISK DEVICE WITH IMPROVED SHIELDING

(75) Inventors: Takehiko Eguchi, Ibaraki (JP); Masayuki Kurita, Ibaraki (JP); Toshihiko Shimizu, Ibaraki (JP); Mikio Tokuyama, Ibaraki (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 394 days.

(21) Appl. No.: 11/222,566

(22) Filed: Sep. 9, 2005

(65) Prior Publication Data

US 2006/0056104 A1    Mar. 16, 2006

(30) Foreign Application Priority Data

Sep. 10, 2004    (JP) .............................. 2004-263309

(51) Int. Cl.
*G11B 5/39* (2006.01)
(52) U.S. Cl. .................................................. 360/97.03
(58) Field of Classification Search .............. 360/97.01, 360/97.02, 98.01, 97.03
See application file for complete search history.

(56) References Cited

U.S. PATENT DOCUMENTS

| | | | | |
|---|---|---|---|---|
| 4,583,213 A | * | 4/1986 | Bracken et al. ............ | 369/261 |
| 4,660,110 A | * | 4/1987 | Iida et al. ................. | 360/97.03 |
| 4,725,904 A | * | 2/1988 | Dalziel ..................... | 360/78.13 |
| 5,631,787 A | * | 5/1997 | Huang et al. ............. | 360/97.02 |
| 5,696,649 A | * | 12/1997 | Boutaghou ............... | 360/97.03 |
| 6,229,304 B1 | * | 5/2001 | Guzik ........................ | 324/212 |
| 6,271,987 B1 | * | 8/2001 | Allsup et al. ............. | 360/97.03 |
| 6,462,901 B1 | * | 10/2002 | Tadepalli ................. | 360/97.03 |
| 6,487,038 B1 | * | 11/2002 | Izumi et al. .............. | 360/97.02 |
| 6,542,327 B2 | * | 4/2003 | Takaike .................... | 360/97.02 |
| 6,735,045 B2 | * | 5/2004 | Suzuki et al. ............ | 360/97.02 |
| 6,751,050 B1 | * | 6/2004 | Tokuyama et al. ....... | 360/98.01 |
| 6,922,308 B1 | * | 7/2005 | Butler ....................... | 360/97.02 |
| 7,072,141 B2 | * | 7/2006 | Tokuyama et al. ....... | 360/97.02 |
| 7,283,324 B2 | * | 10/2007 | Sasaki ....................... | 360/97.03 |
| 2002/0071202 A1 | * | 6/2002 | Myokan et al. ........... | 360/97.02 |

(Continued)

FOREIGN PATENT DOCUMENTS

JP    2000040340 A   *   2/2000

(Continued)

OTHER PUBLICATIONS

English Machine Translation of JP 2003-077266.*

*Primary Examiner*—Jefferson Evans
(74) *Attorney, Agent, or Firm*—Townsend and Townsend and Crew LLP; Darren Gold (57) ABSTRACT

Embodiments of the invention provide a magnetic disk device which improves the shielding function for the magnetic heads while maintaining a form factor having an inexpensive constitution. In one embodiment, a magnetic disk device comprises a rotary disk-type magnetic disk; a magnetic head for recording or reproducing information; a magnetic head support mechanism for supporting the magnetic head; a shroud having an opening in which the magnetic head support mechanism is inserted, and surrounding the outer circumference of the magnetic disk; and a housing. The housing includes a base and a cover, and accommodates the magnetic disk, the magnetic head, the magnetic head support mechanism and the shroud. The base is constituted by using a nonmagnetic material and the shroud is constituted by using a magnetic material.

12 Claims, 10 Drawing Sheets

U.S. PATENT DOCUMENTS

2002/0171972 A1* 11/2002 Izumi et al. ............... 360/97.02
2003/0099054 A1    5/2003 Kamijima
2003/0189785 A1* 10/2003 Shimizu et al. .......... 360/97.03
2005/0185324 A1*  8/2005 Suwa et al. ............... 360/97.02
2006/0056105 A1*  3/2006 Eguchi et al. ............ 360/97.02

FOREIGN PATENT DOCUMENTS

JP         2003-077266 A     3/2003

* cited by examiner

| DISTANCE FROM COVER | 1mm | 5mm | 10mm | 15mm | 19mm |
|---|---|---|---|---|---|
| VERTICAL MAG. FLUX DENSITY (G) RADIAL POSITION 15mm | 168 | 172 | 190 | 224 | 258 |
| RADIAL POSITION 19mm | 184 | 187 | 204 | 231 | 255 |
| RADIAL POSITION 24mm | 188 | 192 | 208 | 233 | 257 |
| RADIAL POSITION 28mm | 182 | 187 | 204 | 233 | 260 |
| RADIAL POSITION 33mm | 172 | 173 | 192 | 229 | 269 |
| RADIAL POSITION 37mm | 149 | 149 | 167 | 216 | 289 |
| RADIAL POSITION 42mm | 130 | 123 | 135 | 183 | 333 |

|  | r1 | r2 | r3 | r4 |
|---|---|---|---|---|
| SHROUD | MAGNETIC MATERIAL | MAGNETIC MATERIAL | MAGNETIC MATERIAL | MAGNETIC MATERIAL |
| COVER | MAGNETIC MATERIAL | MAGNETIC MATERIAL | NONMAGNETIC MATERIAL | NONMAGNETIC MATERIAL |
| SHAFT | MAGNETIC MATERIAL | NONMAGNETIC MATERIAL | MAGNETIC MATERIAL | NONMAGNETIC MATERIAL |
| RADIAL POSITION 15mm | 190 | 237 | 239 | 277 |
| RADIAL POSITION 19mm | 204 | 233 | 254 | 274 |
| RADIAL POSITION 24mm | 208 | 227 | 257 | 268 |
| RADIAL POSITION 28mm | 204 | 217 | 251 | 258 |
| RADIAL POSITION 33mm | 192 | 201 | 234 | 239 |
| RADIAL POSITION 37mm | 167 | 173 | 201 | 203 |
| RADIAL POSITION 42mm | 135 | 139 | 157 | 158 |

| | p1 | p2 | p3 | p4 |
|---|---|---|---|---|
| SHROUD | MAGNETIC MATERIAL | MAGNETIC MATERIAL | MAGNETIC MATERIAL | MAGNETIC MATERIAL |
| COVER | MAGNETIC MATERIAL | MAGNETIC MATERIAL | NONMAGNETIC MATERIAL | NONMAGNETIC MATERIAL |
| SHAFT | MAGNETIC MATERIAL | NONMAGNETIC MATERIAL | MAGNETIC MATERIAL | NONMAGNETIC MATERIAL |
| MAG. FLUX DENSITY (G) RADIAL POSITION 15mm | 173 | 214 | 223 | 259 |
| RADIAL POSITION 17mm | 179 | 210 | 229 | 255 |
| RADIAL POSITION 19mm | 181 | 206 | 230 | 249 |
| RADIAL POSITION 22mm | 179 | 199 | 227 | 241 |
| RADIAL POSITION 24mm | 174 | 190 | 219 | 230 |
| RADIAL POSITION 26mm | 165 | 178 | 206 | 213 |
| RADIAL POSITION 28mm | 152 | 162 | 186 | 192 |
| RADIAL POSITION 30mm | 135 | 142 | 161 | 165 |
| RADIAL POSITION 32mm | 118 | 123 | 137 | 139 |

MAGNETIC DISK DEVICE WITH IMPROVED SHIELDING

CROSS-REFERENCES TO RELATED APPLICATIONS

This application claims priority from Japanese Patent Application No. JP 2004-263309, filed Sep. 10, 2004, the entire disclosure of which is incorporated herein by reference.

BACKGROUND OF THE INVENTION

This invention relates to a magnetic disk device and, particularly, to a magnetic disk device for recording information relying upon a vertical magnetic recording system.

In a magnetic disk device employing the vertical magnetic recording system, when a magnetic field is applied from the outer side, the magnetic head works to concentrate the external magnetic field onto a main magnetic pole due to the constitution of the magnetic head often arising a problem in that the data recorded on a disk are destroyed. Since it is not possible to decrease the intensity of the external floating magnetic field itself acting on the magnetic disk device, it is necessary to provide the magnetic disk device with a function that exhibits shielding effect against the external magnetic field (to weaken the intensity of the external magnetic field).

Therefore, there has heretofore been devised a magnetic disk device as taught in JP-A-2003-77266 (patent document 1). The magnetic disk device of the patent document 1 comprises a rotary disk-type magnetic disk for recording information relying upon the vertical magnetic recording system, a magnetic head for recording information into the magnetic disk and for reproducing information from the magnetic disk, a disk drive mechanism for supporting the magnetic head in a manner to move in the radial direction of the magnetic disk, a housing having a base and a cover, and a shielding member constituted by using a magnetic member to magnetically shield the magnetic head.

In an embodiment illustrated in FIGS. 1 to 16 of the patent document 1, the housing accommodates therein the magnetic disk, magnetic head and disk drive mechanism, and a shielding member is provided over the upper surface, lower surface and side surfaces of the housing inclusive of the upper and lower sides over a range in which the magnetic head moves (prior art 1).

In an embodiment illustrated in FIG. 17 of the patent document 1, the housing accommodates therein the magnetic disk, the magnetic head, the disk drive mechanism and the shielding member, the shielding member being provided only over the base portion and the cover portion that are facing the magnetic head (prior art 2).

In an embodiment illustrated in FIG. 18 of the patent document 1, the housing accommodates therein the magnetic disk, the magnetic head and the disk drive mechanism, the housing is partly cut away, a shielding member is disposed therein, the front end side of the shielding member is extended to both sides of the magnetic disk, and the end surfaces thereof are faced to the end surface of the magnetic head (prior art 3).

In an embodiment illustrated in FIG. 19 of the patent document 1, the housing accommodates therein the magnetic disk, the magnetic head and the disk drive mechanism, a recessed portion is formed in the outer surface of the housing, a shielding member is disposed in the recessed portion, the front end side of the shielding member is extended to both sides of the magnetic disk, and the ends thereof are faced to the end of the magnetic head (prior art 4).

BRIEF SUMMARY OF THE INVENTION

According to the prior art 1, however, the shielding member is provided on the outside of the housing separated away from the magnetic head and, hence, the shielding function is not fully exhibited and, further, the external size increases by the size of the shielding member. A limitation has been imposed on the size of the magnetic disk device of this kind such as of the 2.5-type (mobile type) and the 3.5-type, and it is important that the predetermined size (form factor) is not exceeded even when the magnetic shielding function is imparted.

According to the prior art 2, the shielding member is provided on only the base portion and the cover portion corresponding to the magnetic head, making it difficult to exhibit the shielding function to a sufficient degree.

According to the prior art 3 or 4, the housing is partly cut away or a recessed portion is provided therein, and the shielding member is disposed therein. Therefore, it becomes necessary to provide a housing of a particular shape and to impart the function of a housing to the shielding member, arising the problem of increased cost.

Moreover, the prior arts 1 to 4 are not capable of exhibiting the shielding function to a sufficient degree against the external magnetic field which is in the transverse direction of the magnetic head (from the direction of the side surfaces).

It is a feature of the present invention to provide a magnetic disk device capable of improving the shielding function for the magnetic head yet maintaining a form factor relying upon an inexpensive constitution.

A first embodiment of the present invention is concerned with a magnetic disk device comprising a rotary disk-type magnetic disk; a magnetic head for recording information into the magnetic disk and for reproducing information from the magnetic disk; a magnetic head support mechanism for supporting the magnetic head; a shroud having an opening in which the magnetic head support mechanism is inserted, and is surrounding the outer circumference of the magnetic disk; and a housing including a base and a cover, and is accommodating the magnetic disk, the magnetic head, the magnetic head support mechanism and the shroud; wherein the base is constituted by using a nonmagnetic material and the shroud is constituted by using a magnetic material.

A more preferred concrete constitution of the first embodiment of the invention is as follows: (1) The shroud has at least an upper end or a lower end which is continuous over the whole circumference to form the opening.

A second embodiment of the present invention is concerned with a magnetic disk device comprising a rotary disk-type magnetic disk; a magnetic head for recording information into the magnetic disk and for reproducing information from the magnetic disk; a magnetic head support mechanism for supporting the magnetic head; a shroud having an opening in which the magnetic head support mechanism is inserted, and is surrounding the outer circumference of the magnetic disk; and a housing including a base and a cover, and is accommodating the magnetic disk, the magnetic head, the magnetic head support mechanism and the shroud; wherein the base is constituted by using a nonmagnetic material, the cover is constituted by using a magnetic material to cover the magnetic disk, and the shroud is constituted by using a magnetic material so as to be joined to the cover.

A more preferred concrete constitution of the second embodiment of the invention is as follows: (1) The cover has a thickness in a range of from about 0.5 mm to 1.5 mm.

A third embodiment of the present invention is concerned with a magnetic disk device comprising a rotary disk-type magnetic disk; a spindle mechanism which supports the central portion of the magnetic disk to turn the magnetic disk; a magnetic head for recording information into the magnetic disk and for reproducing information from the magnetic disk; a magnetic head support mechanism for supporting the magnetic head; a shroud having an opening in which the magnetic head support mechanism is inserted, and is surrounding the outer circumference of the magnetic disk; and a housing including a base and a cover, and is accommodating the magnetic disk, the spindle mechanism, the magnetic head, the magnetic head support mechanism and the shroud; wherein the base is constituted by using a nonmagnetic material, the shroud is constituted by using a magnetic material, and the shaft of the spindle mechanism is constituted by using a magnetic material.

A more preferred concrete constitution of the third embodiment of the invention is as follows: (1) The cover is constituted by using a magnetic material, and the shaft of the spindle mechanism is joined to the cover via a fastening fitting constituted by using a magnetic material.

A fourth embodiment of the present invention is concerned with a magnetic disk device comprising a rotary disk-type magnetic disk; a spindle mechanism which supports the central portion of the magnetic disk to turn the magnetic disk; a magnetic head for recording information into the magnetic disk and for reproducing information from the magnetic disk; a magnetic head support mechanism for supporting the magnetic head; a shroud having an opening in which the magnetic head support mechanism is inserted, and is surrounding the outer circumference of the magnetic disk; and a housing including a base and a cover, and is accommodating the magnetic disk, the spindle mechanism, the magnetic head, the magnetic head support mechanism and the shroud; wherein the base is constituted by using a nonmagnetic material, the cover is constituted by using a magnetic material to cover the magnetic disk, the shroud is constituted by using a magnetic material and is joined to the cover constituted by using the magnetic material, and the shaft of the spindle mechanism is constituted by using a magnetic material and is joined to the cover.

A fifth embodiment of the present invention is concerned with a magnetic disk device comprising a rotary disk-type magnetic disk; a magnetic head for recording information into the magnetic disk and for reproducing information from the magnetic disk; a magnetic head support mechanism for supporting the magnetic head; a shroud having an opening in which the magnetic head support mechanism is inserted, and is surrounding the outer circumference of the magnetic disk; a housing including a base and a cover, and is accommodating the magnetic disk, the magnetic head, the magnetic head support mechanism and the shroud; and an upper shield provided on the inside of the cover; wherein the base and the cover are constituted by using a nonmagnetic material, the upper shield is constituted by using a magnetic material so as to cover the magnetic disk, and the shroud is constituted by using a magnetic material and is joined to the upper shield.

A more preferred concrete constitution of the fifth embodiment of the invention is as follows: (1) The spindle mechanism and the upper shield are not in contact with each other.

The invention realizes a magnetic disk device capable of improving the shielding function for the magnetic head yet maintaining a form factor relying upon an inexpensive constitution.

DETAILED DESCRIPTION OF THE INVENTION

A plurality of embodiments of the invention will now be described with reference to the drawings. In the drawings of the embodiments, the same reference numerals represent the same parts or the corresponding parts. Further improved effects can be obtained by suitably combining the embodiments as required.

Figure 1:
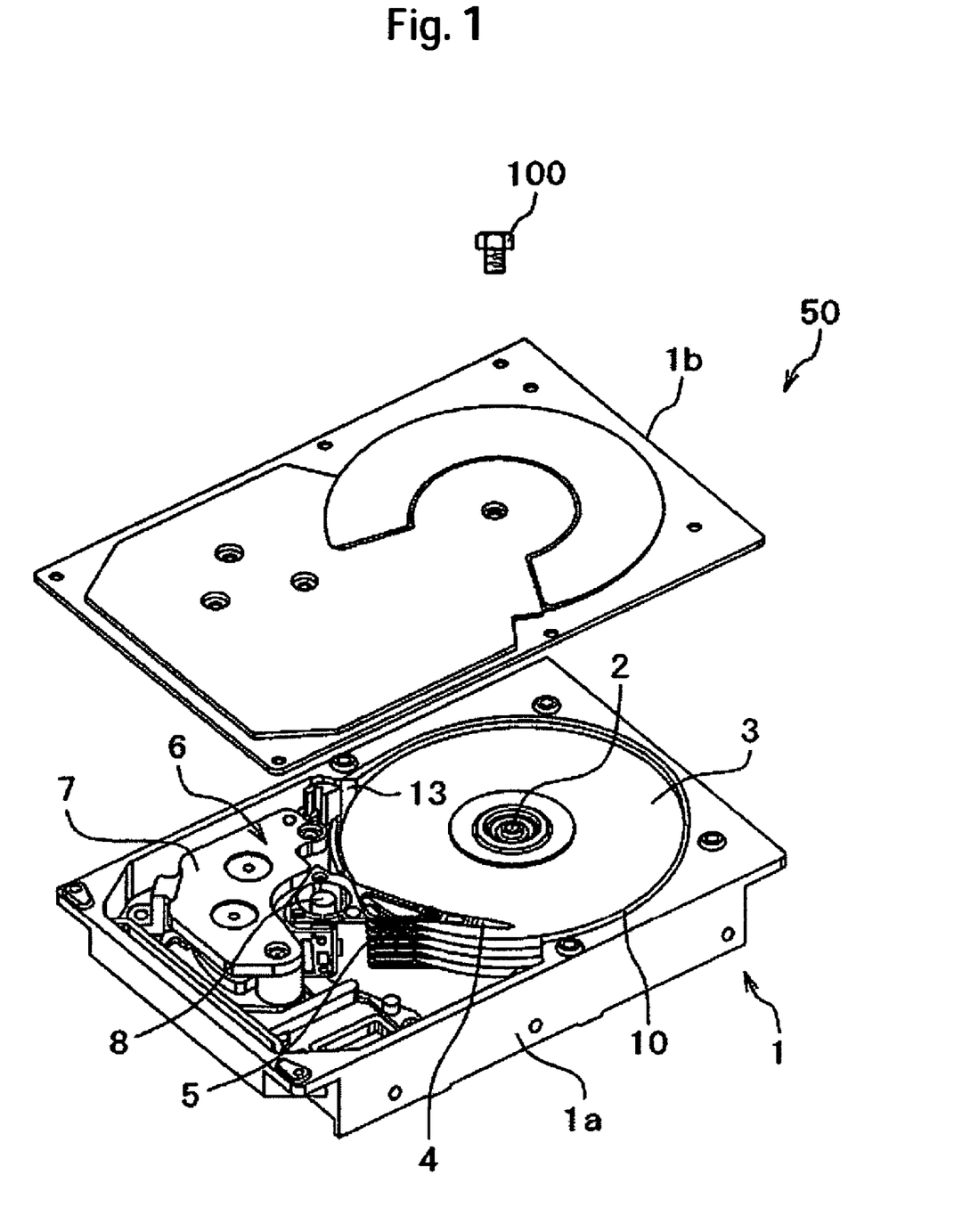
FIG. 1 is a perspective view of the magnetic disk device of a first embodiment of the invention.
Figure 3:
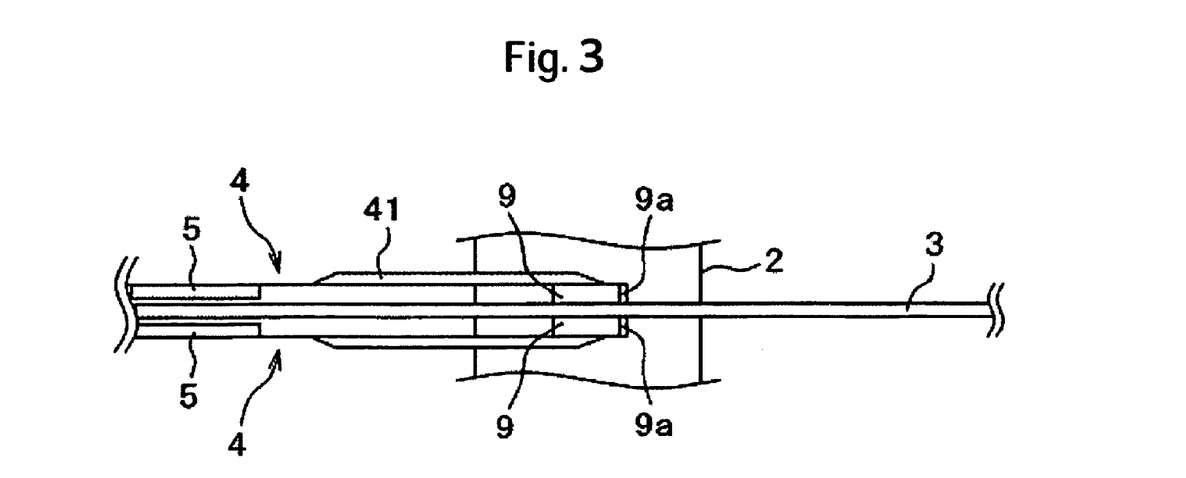
FIG. 3 is a side view of a magnetic head slider unit of FIG. 1.
Figure 4:
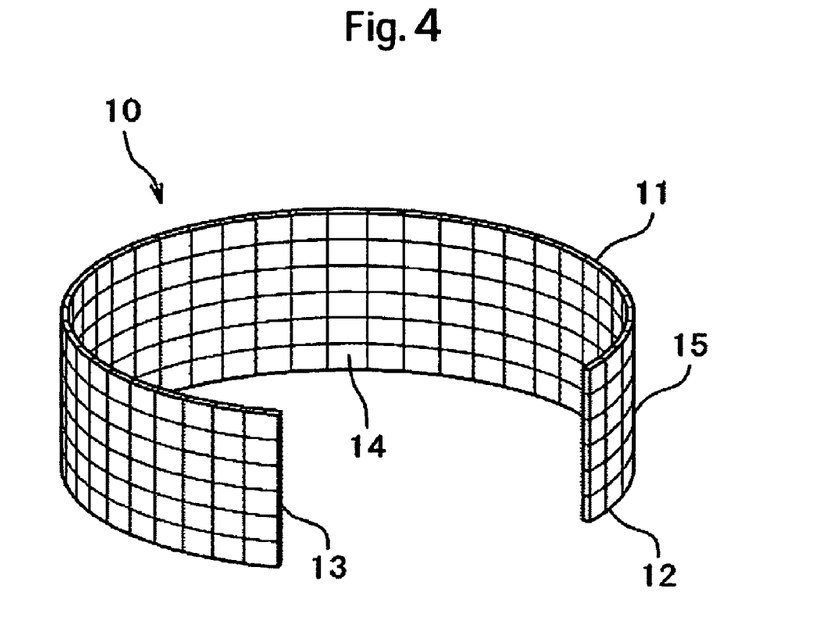
FIG. 4 is a perspective view of a shroud of FIG. 1 in the state of a single unit thereof.

A magnetic disk device of a first embodiment of the invention will now be described with reference to FIGS. 1 to 12. The whole constitution of the magnetic disk device 50 of the embodiment will now be described with reference to FIGS. 1 to 4. FIG. 1 is a perspective view of the magnetic disk device 50 of this embodiment, FIG. 2 is a vertical sectional view of a spindle mechanism unit of FIG. 1, FIG. 3 is a side view of a magnetic head slider unit of FIG. 1, and FIG. 4 is a perspective view of a shroud of FIG. 1 in the state of a single unit thereof.

The magnetic disk device 50 accommodates a spindle mechanism 2, a magnetic disk 3, a magnetic head support mechanism 4, a positioning mechanism 6 and a shroud 10 inside a housing 1.

The housing 1 is constituted by a base 1a of the shape of a lunch box and a cover 1b covering the opening in the upper surface of the base 1a, and is of a structure which is split into upper and lower halves. The base 1a is of a structure same as the housing of a general magnetic disk device, and is constituted by using a nonmagnetic material (e.g., aluminum or the like). The base 1a has a surrounding wall for accommodating the magnetic disk 3 and the shroud 10. The cover 1b is constituted by using a magnetic material and forms a shielding member. The cover 1b and the base 1a are secured together by using a fastening fitting (not shown), and the cover 1b and the spindle mechanism 2 are secured together by using a fastening fitting (e.g., screw) 100 made of a magnetic material.

Figure 2:
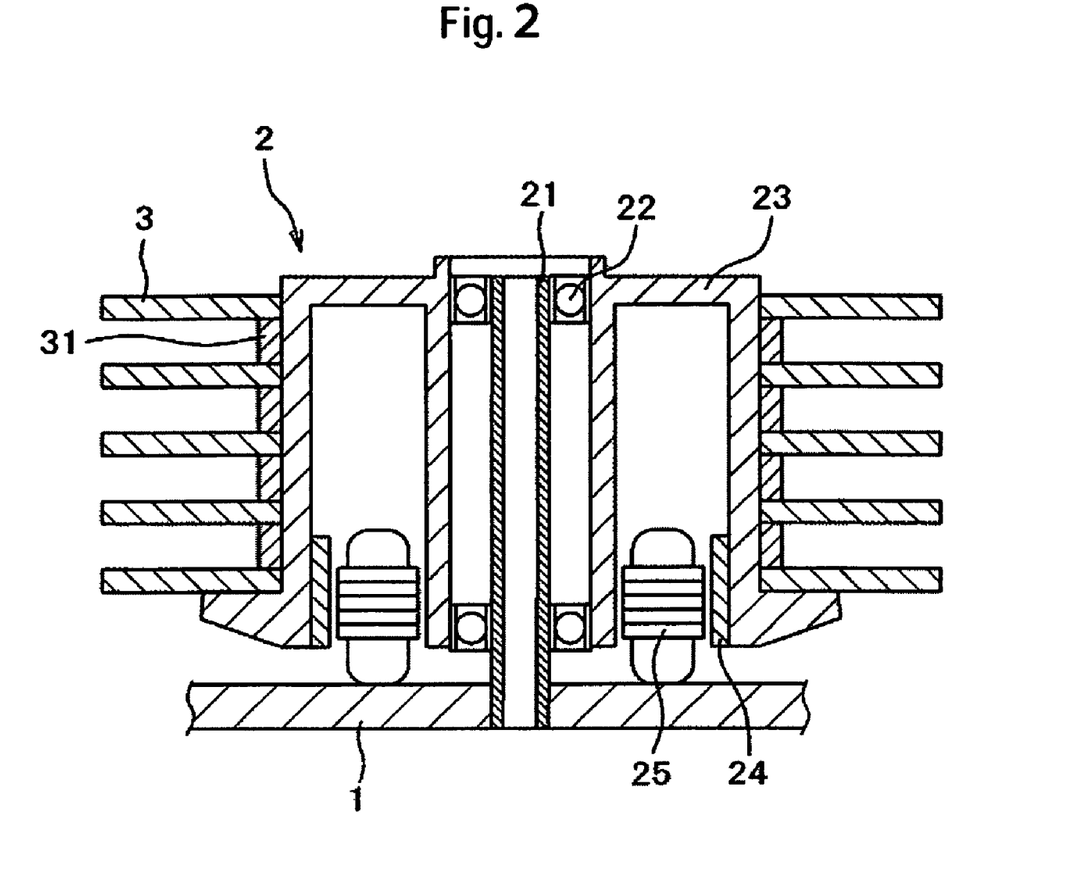
FIG. 2 is a vertical sectional view of a spindle mechanism unit of FIG. 1.

The spindle mechanism 2 is for rotating the magnetic disk 3 and is constituted, as shown in FIG. 2, by a shaft (stationary shaft) 21 made of a magnetic material, bearings 22 provided at the upper and lower portions of the shaft 21, a hub 23 joined to the bearings 22, a magnet 24 attached to the hub 23, and a coil 25 that generates a magnetic field upon being fed with electricity. One end (lower end) of the shaft 21 made of the magnetic material is joined to the base 1a, and the other end (upper end) thereof is joined to the cover 1b made of the magnetic material by the fastening fitting 100 made of the magnetic material. That is, the other end of the shaft 21 is magnetically joined to the cover 1b. In this embodiment, the bearings 22 are ball bearings which, however, may be fluid bearings (plain bearings).

The magnetic disk 3 is constituted by a rotary disk-type magnetic disk with which information is recorded onto annular tracks by the vertical magnetic recording system. A plurality of pieces (five pieces in the drawing) of magnetic disks 3 are stacked and secured to the hub 23 of the spindle mechanism 2 as shown in FIG. 2, and are rotated at a high speed. The plurality of magnetic disks 3 are arranged maintaining an equal distance via spacers 31. There are provided many annular tracks from the inner circumference toward the outer circumference of the magnetic disks 3. Magnetic heads 9a (see FIG. 3) which are element units are moved and positioned on the tracks by a magnetic head support mechanism 4 and a positioning mechanism 6 to conduct the recording or reproducing operation. The magnetic head 9a is provided on the front surface side (cover side) and on the back surface side (base side) of each magnetic disk 3. The magnetic disk 3 has an outer diameter of about 84 mm and an inner diameter of about 30 mm, i.e., it is a magnetic disk device of a size that is usually called 3.5-type magnetic disk device. Here, the magnetic disk 3 that is mounted is 3 inches in size (outer diameter of 84 mm).

The magnetic head support mechanism 4 is for supporting the magnetic head 9a for recording information into the magnetic disk 3 or for reproducing information from the magnetic disk 3, and is constituted, as shown in FIG. 3, by a magnetic head slider 9 that mounts the magnetic head 9a and floats on the magnetic disk 3, and a suspension 40 supporting the magnetic head slider 9 on the front end side.

The magnetic head slider 9 mounts the magnetic head 9a on the front end side thereof and is so constituted as to float on the disk surface due to an air stream created accompanying the rotation of the magnetic disk 3. The magnetic head slider 9 (magnetic head 9a) is so supported as to move in the radial direction of the magnetic disk 3. A suspension 41 is pivotally supported so that it will not to lock the motion of the magnetic head slider 9, and it gives a pushing load onto the magnetic head slider 9 so that the magnetic head slider 9 is pushed onto the disk surface. The root side of the suspension 41 (i.e., root side of the magnetic head support mechanism 4) is coupled to an arm 5.

The positioning mechanism 6 includes the arm 5, a voice coil motor 7 and a pivot bearing 8, and works to turn (swing) the arm 5 by the voice coil motor 7 with the pivot bearing 8 as a center and to position the magnetic head 9a on a predetermined track of the magnetic disk 3.

The shroud 10 is constituted by using a magnetic material and forms a shielding member. The shroud 10 is of a cylindrical shape surrounding the outer circumference of the magnetic disks 3, and has an opening 13 formed on the side of the positioning mechanism 6 for inserting the magnetic head support mechanism 4. Further, the inner wall 14 of the shroud 10 is separated away by a very small distance from the outer edges of the magnetic disks 3 and is not in contact therewith. It is desired that the gap is not greater than about 0.6 mm from the standpoint of lowering the hydraulic vibration of the disks. The outer wall 15 of the shroud 10 is so provided as to come in contact with the inside of the surrounding wall of the base 1a. The height of the shroud 10 is nearly equal to the height of the base 1a. The lower end 12 of the shroud 10 is placed on the base 1a, and the upper end 11 thereof comes in contact with the cover 1b in a state where the cover 1b is mounted on the base 1a. Therefore, the cover 1b constituted by using the magnetic material and the shroud 10 constituted by using the magnetic material are magnetically coupled together.

In this embodiment, the cover 1b, shroud 10 and shaft 21 are made of a magnetic material so as to be joined together to obtain a markedly improved shielding effect against the external magnetic field.

Figure 5:
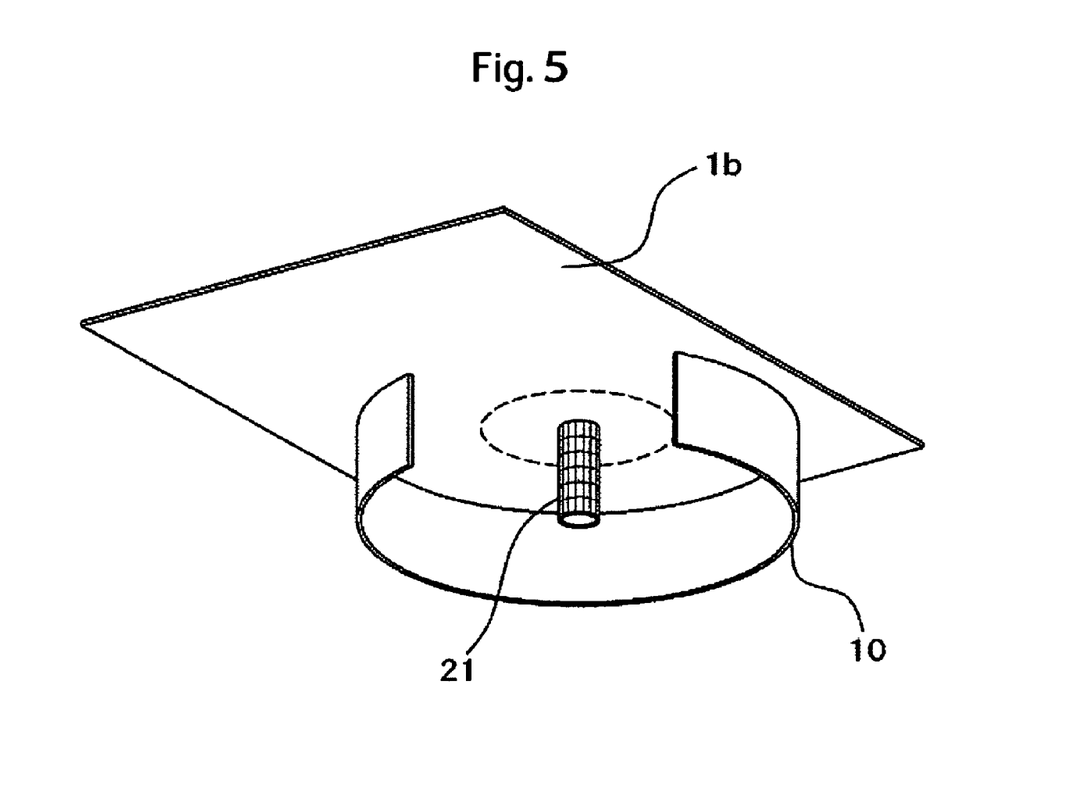
FIG. 5 is a model diagram for calculating the shielding effect.

The shielding effect of the invention will now be described with reference to FIGS. 5 to 11. To make sure the shielding effect of the invention, the shielding effect for the external magnetic field was calculated modeling after the constitution of this embodiment as illustrated in FIG. 5. Reference numerals in FIG. 5 correspond to those of the members of the shielding structure, and the shroud 10 and the shaft 21 are joined to the cover 1b. Here, the calculating conditions are set as described below. All members are made of a magnetic material, i.e., an SPCC (Japanese Industrial Standard for steel sheets) cold steel material used as a yoke member of the voice coil motor 7. The cover 1b and the shroud 10 possess a thickness of 1.0 mm, and the shroud possesses a height of 20 mm. The shaft 21 is a hollow cylinder with an outer size (diameter $\Phi_o$) of 4 mm, an inner size (diameter $\Phi_i$) of 2 mm and a height of 20 mm. Further, the intensity of the external magnetic field (external magnetic flux density) is 300 Gausses, and the direction of the magnetic field is at right angles with the disk surface to most greatly affect the vertical recording of the magnetic disks.

Figure 6:
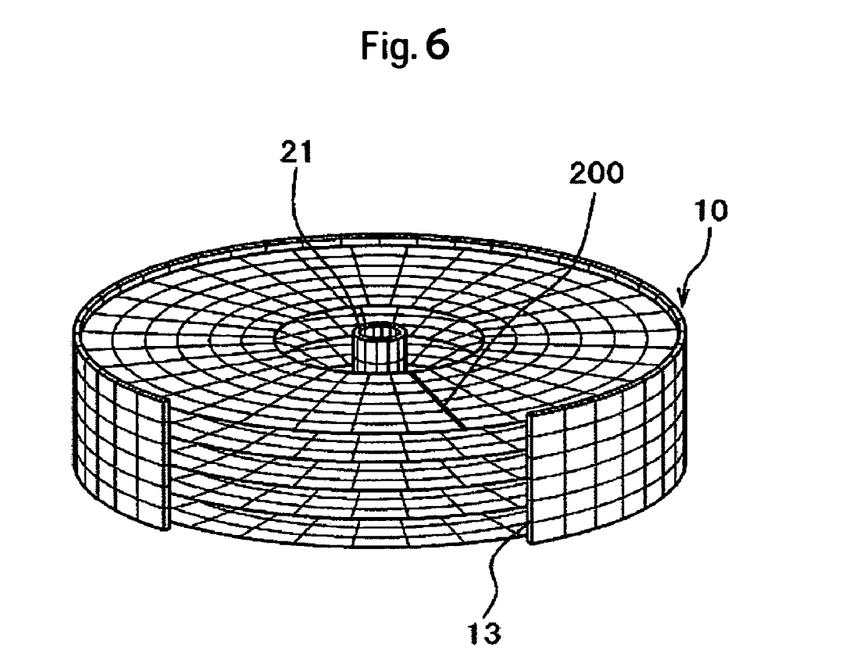
FIG. 6 is a view of observation planes of the model of FIG. 5.

FIG. 6 illustrates observation planes of the calculated results. The magnetic disk device to be measured is mounting five pieces of magnetic disks 3 and, hence, possesses five observation planes being corresponded to the direction of height of the magnetic disks 3. Concretely speaking, the heights from the cover 1b are set to be 1 mm, 5 mm, 10 mm, 15 mm and 19 mm, the radial position is set to be from the innermost circumference (15 mm) of the disk to the outermost circumference (42 mm) thereof, and the position is set to be on an observation line 200 corresponding to the window 13 of the shroud 10. The observation line 200 is nearly on the same position as the locus of when the magnetic head 9a moves in the radial direction.

Figure 7:
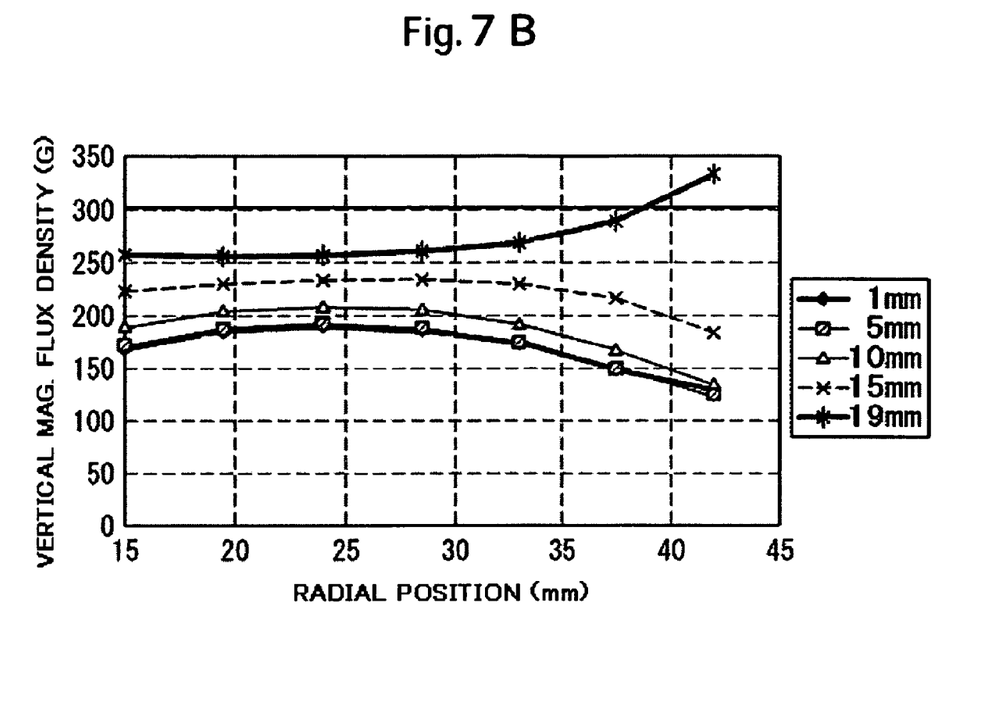
FIG. 7A is a diagram showing by values the results of calculating the magnetic flux densities on the observation planes in the case of a 3-inch disk model.
FIG. 7B is a diagram showing by a graph the results of calculating the magnetic flux densities on the observation planes in the case of the 3-inch disk model.
Figure 7A:
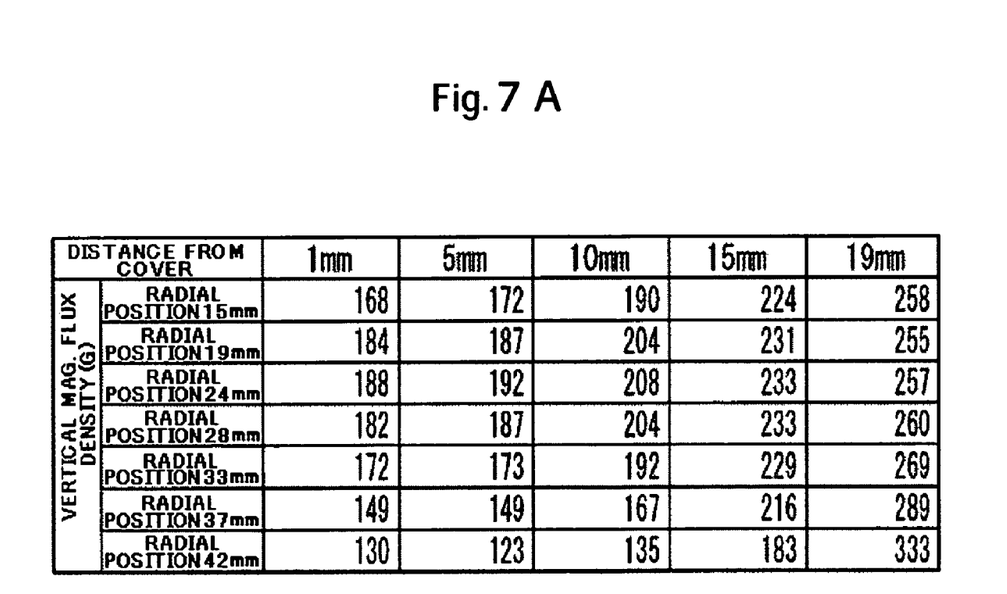

The results calculated under the above conditions are shown as numerical values in FIG. 7A and are shown as a graph in FIG. 7B. It will be understood from FIGS. 7A and 7B that this embodiment produces a shielding effect against the external magnetic flux density of 300 Gausses. Concretely, at a position of a distance of 1 mm from the cover 1b, a conspicuous shielding effect is exhibited from the inner circumference to the outer circumference; i.e., the magnetic flux density is decreased by 56% at the inner circumference and is decreased by 43% at the outer circumference. The effect of decrease remains nearly the same over a distance of 1 mm to 10 mm from the cover 1b and, then, the effect decreases as the distance increases. It will, however, be learned that the effect is obtained at all positions. At a position of 19 mm from the cover 1b (1 mm from the base 1a), however, there is exhibited a phenomenon of a slight increase in the magnetic flux density at the radial position on the outermost circumference (42 mm). When close to the base 1a, therefore, it is desired to utilize the position which is on the inside by about 5 mm from the outermost circumference. In practice, the outermost circumferential region of the magnetic disk 3 is used for handling the magnetic disk 3 but is not used as a region for recording the data, and there is no problem from a practical point of view. When it is desired to use the magnetic disk 3 up to its outer circumference, it is desired to place a disk on the inside (on the cover side) 1 mm away from the end surface on the base side of the shroud 10.

FIGS. 8A and 8B illustrate the shielding effects by the shroud 10, cover 1b and shaft 21. The shielding effects are shown as numerical values in FIG. 8A and are shown as a graph in FIG. 8B. The observation point in the direction of the spindle is at the central position in the direction of height of the shroud 10 (position of a distance of 10 mm from the cover in FIG. 7). The shroud 10, the cover 1b and the shaft 21 are all constituted by using the magnetic material and are joined together to obtain a shielding structure r1. The shroud 10 and the cover 1b are constituted by using the magnetic material and are joined together to obtain a shielding structure r2. The shroud 10 and the shaft 21 are constituted by using the magnetic material to obtain a shielding structure r3. Further, the shroud 10 only is constituted by using the magnetic material to obtain a shielding structure r4.

As will be obvious from FIG. 8A, the shielding structure r1 of a combination of the three members 10, 1b and 21 (structure of the embodiment) makes it possible to obtain the highest shielding effect. Concretely speaking, a decrease of about 50% is accomplished at the outermost circumferential position. It will be further learned that the shielding effect is obtained even with the shielding structure r4 of the shroud 10 only. Concretely speaking, a decrease of about 50% is accomplished at the outermost circumference, and a decrease of about 10% is accomplished even at the innermost circumference. To cope with a low effect on the inner circumference, the shaft 21 may be made of the magnetic material to impart the shielding effect, i.e., to constitute the shielding structure r3, which makes it possible to accomplish a decrease of about 30% on the innermost circumference. With the shielding structure r2 using the shroud 9 and the cover 10 made of the magnetic material, the effect of decrease by the shield can be expected at all radial positions of the magnetic disk 3. The shielding structure r2 makes it possible to expect the effect greater than that of the constitution of the shielding structure r3, which, however, is not as great as the effect of the shielding structure r1 (structure of the embodiment).

As described above, by forming the shroud 10, cover 1b and shaft 21 by using the non-magnetic material and by coupling (joining) them together, it is allowed to obtain a very high shielding effect. Even by using the shroud 10 only, it is learned that the effect can be expected.

Figure 9:
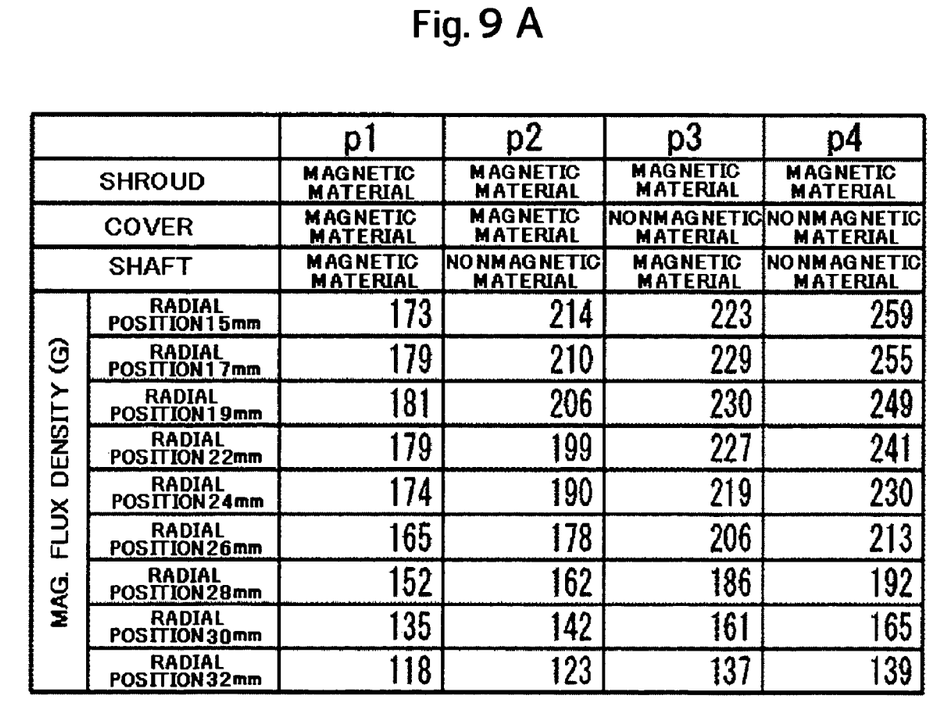
FIG. 9A is a diagram showing by values the results of calculating the magnetic flux densities on the central observation plane in the case of a 2.5-inch disk model.
FIG. 9B is a diagram showing by a graph the results of calculating the magnetic flux densities on the central observation plane in the case of the 2.5-inch disk model.
Figure 9B:
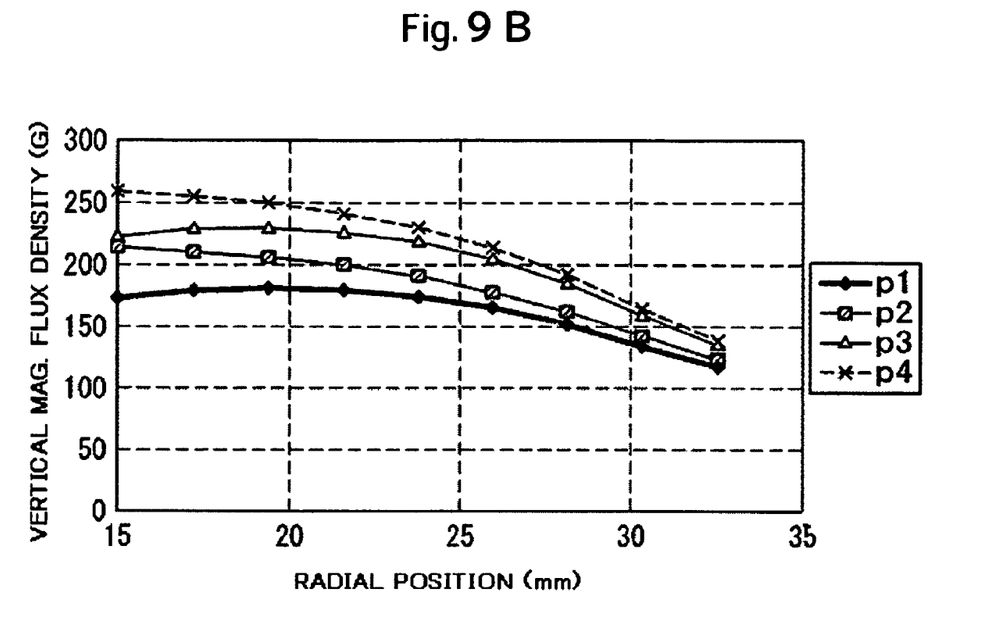

FIGS. 9A and 9B illustrate the effect of when the magnetic disk 3 has a diameter of 2.5 inches. The 2.5-type disk has been used in high-speed rotary devices and in mobile personal computers. The shielding effects are shown as numerical values in FIG. 9A and are shown as a graph in FIG. 9B. As will be obvious from FIGS. 9A and 9B, the shielding effect of the invention is exhibited even for the 2.5-type magnetic disk device and to a degree greater than that of the case of the 3.5-type magnetic disk device. Concretely speaking, in the constitution of the shielding structure p1 joining the shroud 10, the cover 1b and the shaft 21 together, a decrease of 54% is accomplished at the outermost circumference. Even in the case of the 2.5-type magnetic disk device, the tendency of the shielding effect by a combination of the three members 10, 1b and 21 is the same as that of the 3.5-type magnetic disk device. Namely, though the effect is exhibited even by using the shroud 10 only, the effect is exhibited most greatly in the case of this embodiment; i.e., the effect of decrease is not smaller than about 3 times ((300−173)/(300−259)) as great on the innermost circumference as compared to the case of the shroud 10 only.

Figure 10:
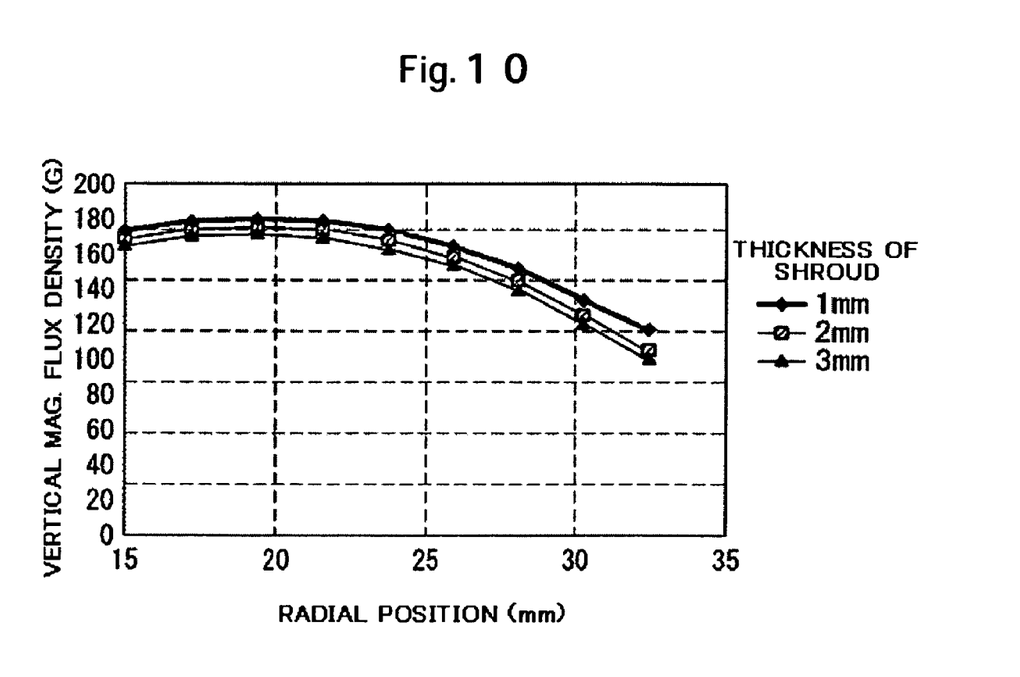
FIG. 10 is a diagram showing by a graph the results of calculating the magnetic flux densities on an upper observation plane in the case when the thickness of the shroud is varied using the 2.5-inch disk model.

FIG. 10 illustrates a relationship between the thickness of the shroud and the magnetic flux density in the shielding structure of this embodiment. When the thickness of the shroud is in a range of from 1 mm to 3 mm, there is no great difference in the shielding effect. It will, however, be learned that the shielding effect increases with an increase in the thickness of the shroud.

Figure 11:
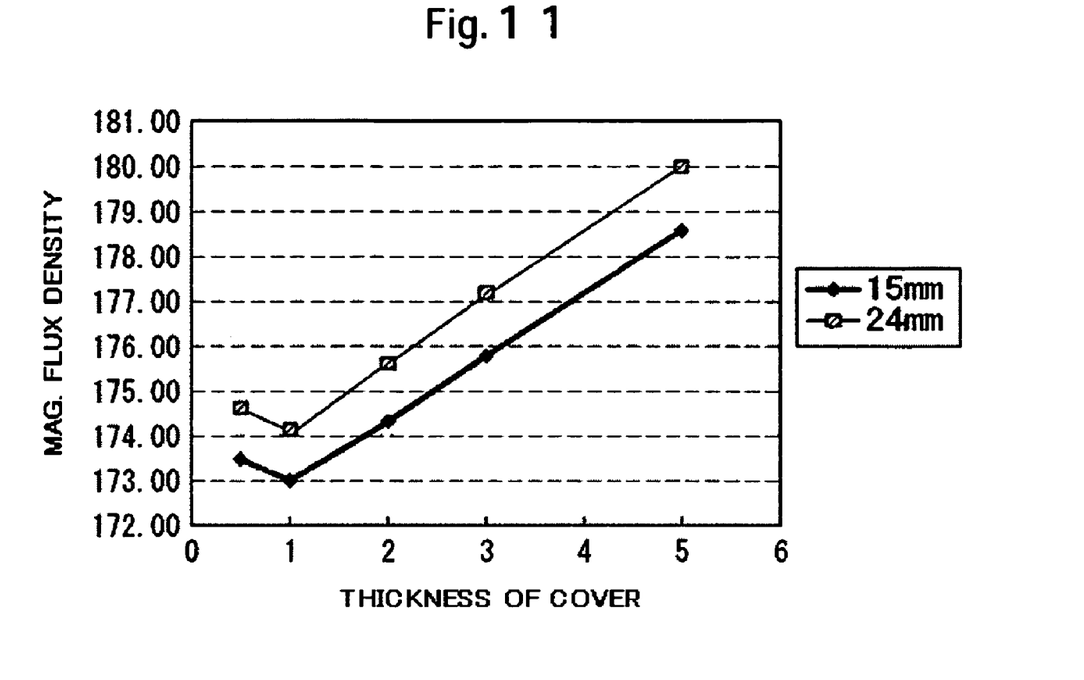
FIG. 11 is a diagram showing by a graph the results of calculating the magnetic flux densities on the upper observation plane in the case when the thickness of the cover is varied using the 2.5-inch disk model.

FIG. 11 illustrates a relationship between the thickness of the cover and the magnetic flux density in the shielding structure of this embodiment. The radial positions of the disk are selected to be two places of 15 mm and 24 mm. As will be learned from FIG. 11, in a range in which the cover thickness is from about 0.5 mm to 5 mm, the absolute value of the shielding effect does not much change (difference is 3%). It will, however, be learned that the magnetic flux density becomes the smallest when the thickness of the cover 1b is 1 mm, and the highest shielding effect is obtained. It is therefore desired that the thickness of the cover 1b is, particularly, about 1 mm (concretely, in a range of about 0.5 mm to 1.5 mm).

Figure 12:
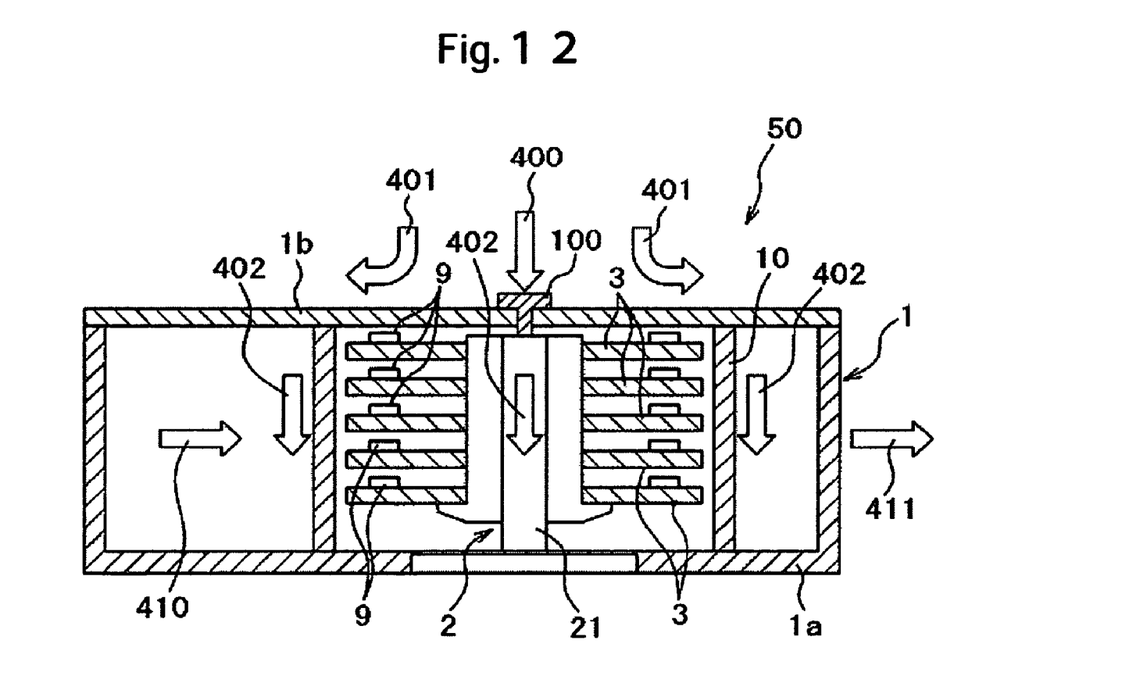
FIG. 12 is a view schematically illustrating the effect of the first embodiment.

FIG. 12 is a view schematically illustrating the mechanism of shielding effect of the present embodiment. Described below with reference to FIG. 12 is a flow of magnetic flux vectors of when external magnetic fluxes 400 and 401 are falling perpendicularly on the magnetic disks 3 from the side of the cover to the side of the base. A magnetic flux vector 401 perpendicularly falling on the disk surface is bent through the cover 1b of the magnetic material into the magnetic flux vector 401, turns into a magnetic flux vector 402 passing through the shroud 10 of the magnetic material, and goes out of the magnetic disk device from the shroud 10. The magnetic flux vector 400 incident near the fastening fitting 100 flows through the shaft 21 of the spindle mechanism through the fastening fitting 100, flows as the magnetic flux vector 403 through the shaft 21, guided to the side of the base 1a, and goes out of the magnetic disk device. As described above, the magnetic flux vector incident at right angles on the disk surface flows from the cover 1b through the shroud 10 or from the cover 1b through the shaft 21 or, in other words, flows detouring the magnetic head slider 9 (magnetic head 9a). Therefore, the magnetic flux density decreases at the positions of the magnetic head sliders 9 (magnetic heads 9a) exhibiting the shielding effect to a conspicuous degree.

Owing to the constitution of this embodiment, even when the magnetic head sliders 9 (magnetic heads 9a) are placed in the magnetic flux vector 410 which is incident in parallel with the surface of the magnetic disks 3, the magnetic flux flows as a magnetic flux vector 411 through the shroud 10 or from the shroud 10 through the cover 1b toward the opposite side or, in other words, the magnetic flux vector which is horizontally incident flows detouring the magnetic head sliders 9 (magnetic heads 9a). Therefore, the intensity (strength) of the external magnetic field is weakened at the positions of the magnetic head sliders 9 (magnetic heads 9a), and a conspicuous degree of shielding effect can be expected.

In this embodiment as described above, the external magnetic field incident on the disk surface at right angles can be decreased down to about one-half on the inner circumferential position. Therefore, the magnetic disk device of the vertical recording type is not caused by the external magnetic field to incorrectly record or reproduce information, and makes it possible to realize a magnetic disk device of a high recording density (large capacity) highly reliably. Further, this embodiment makes it possible to impart a distinguished shielding function without varying the basic constitution of the magnetic disk device 50 or without changing the material of the base 1a which is a chief part. Concretely, there is no need of winding a shielding member around the device and there is no need of constituting all of the cover and the base by using a magnetic material unlike that of the patent document 1. Therefore, the shielding mechanism is provided while maintaining a form factor without causing the device to become bulky and without decreasing the productivity (without increasing the cost) that stems from the replacement of parts (materials). Further, the shroud 10 has a shielding function and it can be expected to improve the shielding effect against the external magnetic field incident on the disk surfaces aslant or in parallel therewith. The shielding effect against the magnetic field incident on the disk surface aslant or in parallel therewith is an effect specific to this embodiment.

Figure 13:
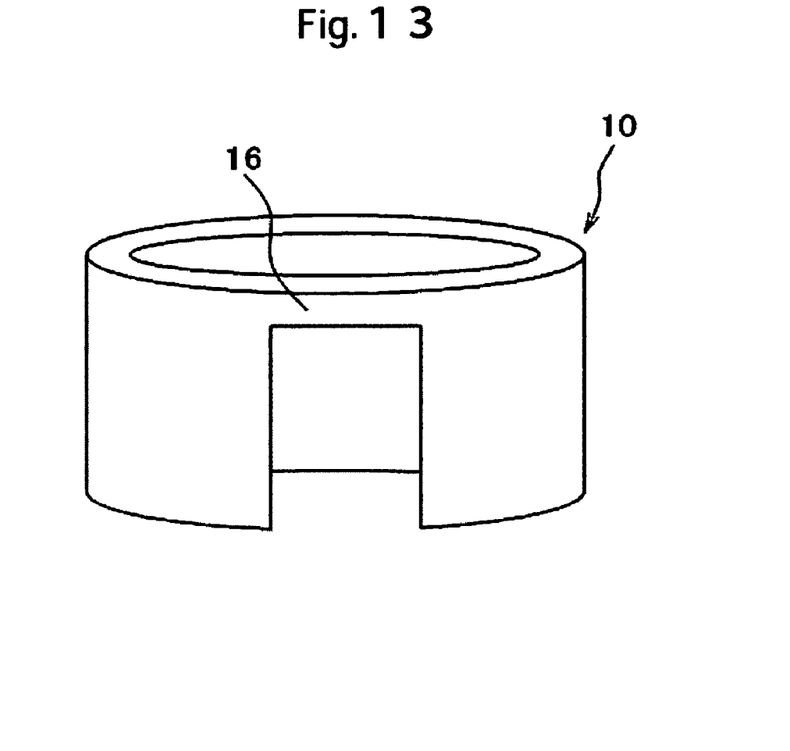
FIG. 13 is a perspective view of a shroud used for the magnetic disk device according to a second embodiment of the invention.

Next, a second embodiment of the present invention will be described with reference to FIG. 13. FIG. 13 is a perspective view of the shroud 10 used for the magnetic disk device of the second embodiment of the present invention. The second embodiment is different from the first embodiment with respect to the point described below. In other respects, the second embodiment is basically the same as the first embodiment.

In the second embodiment, the window 13 of the shroud 10 is coupled by a coupling portion 16. Concretely, as shown in FIG. 13, the coupling portion 16 is provided to couple one end of the window 13 to the other end thereof. By providing the coupling portion 16 as described above, the external magnetic field (magnetic flux vector) passes through the shroud 10 more easily. In other words, more magnetic field passes through the shroud, and the intensity of the magnetic field decreases at the positions of the magnetic head sliders 9 (magnetic heads 9a). Though only one window 13 is provided in the second embodiment, it is also allowable to provide the windows in a number to meet the number of the magnetic head support mechanisms 4. The shielding effect can be enhanced when the windows are small and when the opening (notch) is not running over the whole circumference.

Like the first embodiment, the second embodiment, too, exhibits the shielding effect for weakening the magnetic field at the magnetic head positions when the magnetic disk device is placed in the external magnetic field, preventing incorrect recording or reproduction of information. This makes it possible to realize a highly reliable magnetic disk device. In the second embodiment, the shielding mechanism can also be accommodated in the form factor. Therefore, the shielding effect can be obtained while maintaining the form factor without changing the material of the base which is a principal part of the magnetic disk device. Moreover, since the shroud 10 has a shielding function, it can be expected to improve the shielding effect against the magnetic field incident on the magnetic disk surfaces aslant or in parallel therewith.

Figure 14A:
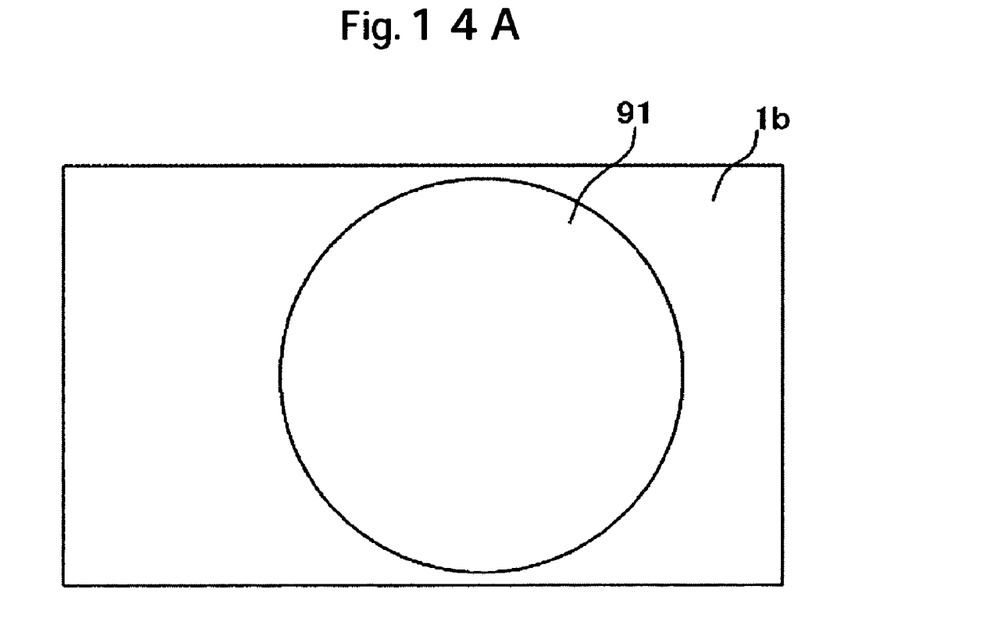
FIG. 14A is a bottom view of a cover used for the magnetic disk device according to a third embodiment of the invention.
Figure 14B:
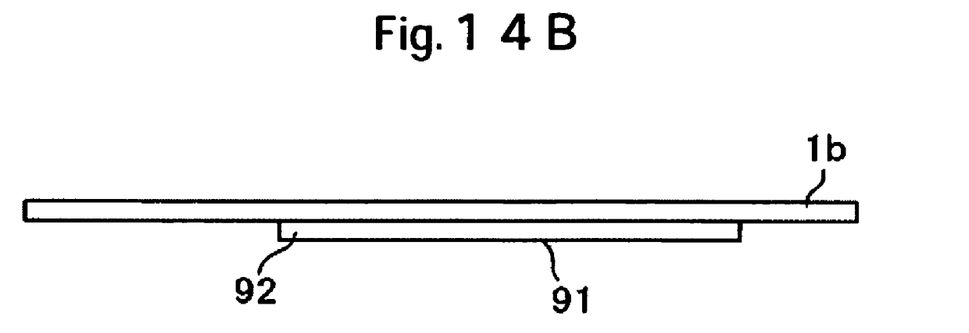
FIG. 14B is a side view of the cover of FIG. 4.
Figure 14C:
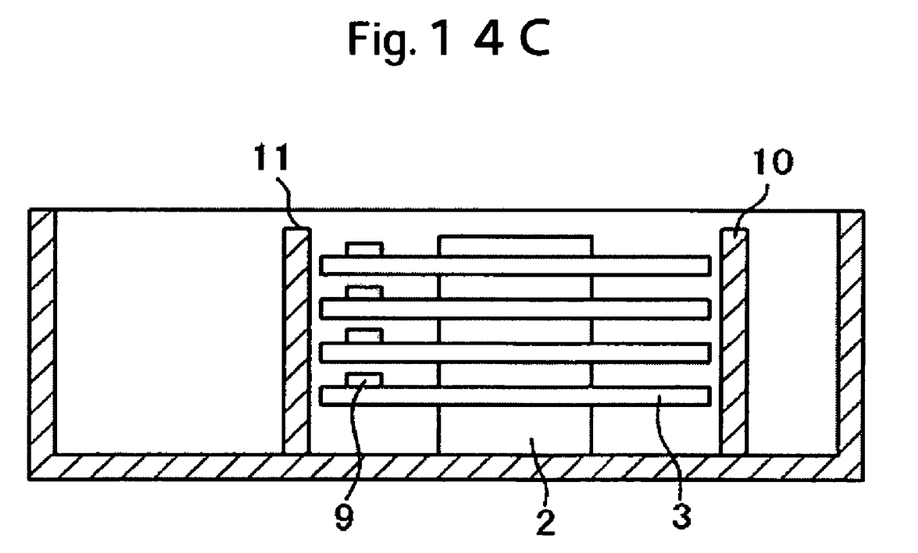
FIG. 14C is a vertical sectional view of the magnetic disk device according to the third embodiment.

Next, a third embodiment of the invention will be described with reference to FIGS. 14A to 14C. FIGS. 14A to 14C illustrate the magnetic disk device of the third embodiment according to the invention. FIG. 14A is a bottom view of when the cover 1b is viewed from the side of the disk surface, FIG. 14B is a side view of the cover 1b, and FIG. 14C is a sectional view of the magnetic disk device on the base side. The third embodiment is different from the first embodiment with respect to the point described below. In other respects, the third embodiment is basically the same as the first embodiment.

In the third embodiment, the cover 1b is constituted by using a nonmagnetic material, and an upper shield 91 made of a magnetic material and having nearly the same size as the outer diameter of the shroud 10 is provided on the inside of the cover 1b (on the side of the disk surface). The upper shield 91 constitutes a portion of the cover 1b. Further, the upper shield 91 is not in contact with the spindle mechanism 2. The outer circumferential portion 92 of the upper shield 91 is in contact with the upper end 11 of the shroud 10 in a state where the cover 1b is mounted on the base 1a. Therefore, there is no need of forming the cover 1b by using the magnetic material, and a conventional cover of a nonmagnetic material can be used. Further, being provided on the inside of the cover 1b, the form factor of the device can be maintained. Moreover, since the cover 1b and the spindle mechanism 2 are not in contact, the embodiment can be applied even to a cantilevered spindle structure.

Figure 8:
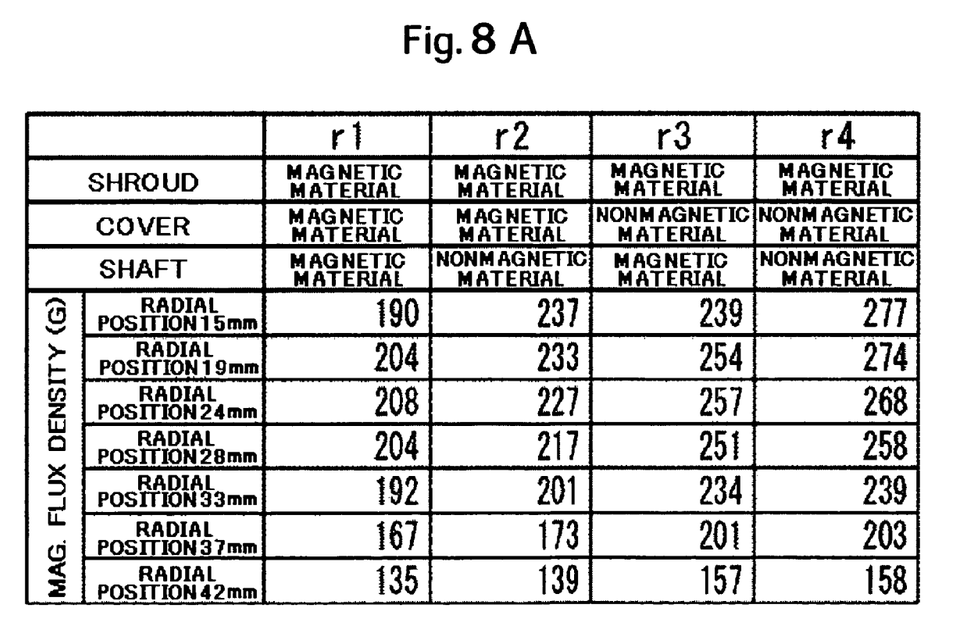
FIG. 8A is a diagram showing by values the results of calculating the magnetic flux densities on a central observation plane in the case of the 3-inch disk model.
FIG. 8B is a diagram showing by a graph the results of calculating the magnetic flux densities on the central observation plane in the case of the 3-inch disk model.

The structure of the third embodiment corresponds to the shielding structure r2 of FIG. 8 and to the shielding structure p2 of FIG. 10, from which the shielding effect same as that of the first embodiment can be expected though the degree of the shielding effect is slightly smaller than that of the shielding effect of the shielding structure r1 of the first embodiment or the shielding effect of the shielding structure p1.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic disk device comprising:
   a rotary disk-type magnetic disk;
   a magnetic head for recording information into said magnetic disk and for reproducing information from said magnetic disk;
   a magnetic head support mechanism configured to support said magnetic head;
   a shroud having an opening in which said magnetic head support mechanism is inserted, and surrounding the outer circumference of said magnetic disk; and a housing including a base and a cover, and accommodating said magnetic disk, said magnetic head, said magnetic head support mechanism and said shroud within said housing;

wherein said base comprises a nonmagnetic material and said shroud comprises magnetic material;

wherein said shroud is in continuous contact with said base and said cover of said housing.

2. A magnetic disk device according to claim 1, wherein said shroud has at least an upper end or a lower end which is continuous over the whole circumference to form said opening.

3. A magnetic disk device comprising:

a rotary disk-type magnetic disk;

a magnetic head for recording information into said magnetic disk and for reproducing information from said magnetic disk;

a magnetic head support mechanism configured to support said magnetic head;

a shroud having an opening in which said magnetic head support mechanism is inserted, and surrounding the outer circumference of said magnetic disk; and a housing including a base and a cover, and accommodating said magnetic disk, said magnetic head, said magnetic head support mechanism and said shroud within said housing;

wherein said base comprises a nonmagnetic material, said cover comprises a magnetic material to cover said magnetic disk, and said shroud comprises a magnetic material so as to be joined to said cover;

wherein said shroud is in continuous contact with said base and said cover of said housing.

4. A magnetic disk device according to claim 3, wherein said cover has a thickness in a range of from about 0.5 mm to about 1.5 mm.

5. A magnetic disk device according to claim 3, wherein said shroud has a thickness of about 1-3 mm.

6. A magnetic disk device comprising:

a rotary disk-type magnetic disk;

a spindle mechanism which supports the central portion of said magnetic disk to turn said magnetic disk;

a magnetic head for recording information into said magnetic disk and for reproducing information from said magnetic disk;

a magnetic head support mechanism configured to support said magnetic head;

a shroud having an opening in which said magnetic head support mechanism is inserted, and surrounding the outer circumference of said magnetic disk; and a housing including a base and a cover, and accommodating said magnetic disk, said spindle mechanism, said magnetic head, said magnetic head support mechanism and said shroud within said housing;

wherein said base comprises a nonmagnetic material, said shroud comprises a magnetic material, and the shaft of said spindle mechanism comprises a magnetic material;

wherein said shroud is in continuous contact with said base and said cover of said housing.

7. A magnetic disk device according to claim 6, wherein said cover comprises a magnetic material, and the shaft of said spindle mechanism is joined to said cover via a fastening fitting made of a magnetic material.

8. A magnetic disk device comprising:

a rotary disk-type magnetic disk;

a spindle mechanism which supports the central portion of said magnetic disk to turn said magnetic disk;

a magnetic head for recording information into said magnetic disk and for reproducing information from said magnetic disk;

a magnetic head support mechanism configured to support said magnetic head;

a shroud having an opening in which said magnetic head support mechanism is inserted, and surrounding the outer circumference of said magnetic disk; and a housing including a base and a cover, and accommodating said magnetic disk, said spindle mechanism, said magnetic head, said magnetic head support mechanism and said shroud within said housing;

wherein said base comprises a nonmagnetic material, said cover comprises a magnetic material to cover said magnetic disk, said shroud comprises a magnetic material and is joined to the cover via said magnetic material, and the shaft of said spindle mechanism comprises a magnetic material and is joined to said cover;

wherein said shroud is in continuous contact with said base and said cover of said housing.

9. A magnetic disk device according to claim 8, wherein said cover has a thickness in a range of from about 0.5 mm to about 1.5 mm.

10. A magnetic disk device comprising:

a rotary disk-type magnetic disk;

a magnetic head for recording information into said magnetic disk and for reproducing information from said magnetic disk;

a magnetic head support mechanism configured to support said magnetic head;

a shroud having an opening in which said magnetic head support mechanism is inserted, and surrounding the outer circumference of said magnetic disk;

a housing including a base and a cover, and accommodating said magnetic disk, said magnetic head, said magnetic head support mechanism and said shroud within said housing; and an upper shield provided on the inside of said cover;

wherein said base and said cover each comprise a nonmagnetic material, said upper shield comprises a magnetic material so as to cover said magnetic disk, and said shroud comprises a magnetic material and is joined to said upper shield;

wherein said shroud is in continuous contact with said base and said cover of said housing.

11. A magnetic disk device according to claim 10, wherein said spindle mechanism and said upper shield are not in contact with each other.

12. A magnetic disk device according to claim 10, wherein said upper shield has an outer circumferential portion in contact with an upper end of the shroud.

* * * * *